(12) United States Patent
Berquist et al.

(10) Patent No.: US 7,588,185 B2
(45) Date of Patent: Sep. 15, 2009

(54) RFID DATA COLLECTION AND USE

(75) Inventors: David T. Berquist, St. Paul, MN (US); Peter M. Eisenberg, Minneapolis, MN (US); Mitchell B. Grunes, Minneapolis, MN (US); Daniel K. McIntyre, St. Paul, MN (US); Diane E. Morel, Shoreview, MN (US); Robert J. Schilling, Cass Lake, MN (US); Paul A. Sevcik, Birchwood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/876,432

(22) Filed: Jun. 7, 2001

(65) Prior Publication Data

US 2002/0185532 A1 Dec. 12, 2002

(51) Int. Cl.
*G06F 19/00* (2006.01)
*G06Q 30/00* (2006.01)
*G06Q 90/00* (2006.01)
(52) U.S. Cl. .................. 235/385; 235/383; 235/492
(58) Field of Classification Search ................. 235/385, 235/375, 380, 383, 492, 493; 340/572.1, 340/568.6, 10.31, 10.51, 10.52, 572.4; 705/22
See application file for complete search history.

(56) References Cited

U.S. PATENT DOCUMENTS

| | | | |
|---|---|---|---|
| 3,593,291 A * | 7/1971 | Carter | ................. 235/380 |
| 3,747,086 A | 7/1973 | Peterson | |
| 3,750,167 A | 7/1973 | Gehman et al. | |
| 3,752,960 A | 8/1973 | Walton | |
| 3,790,945 A | 2/1974 | Fearon | |
| 3,816,708 A | 6/1974 | Walton | |
| 3,893,099 A | 7/1975 | Zoepfl | |
| 4,063,229 A | 12/1977 | Welsh et al. | |
| 4,141,078 A | 2/1979 | Bridges, Jr. et al. | |
| 4,153,931 A | 5/1979 | Green et al. | |
| 4,183,027 A | 1/1980 | Ehrenspeck | |
| 4,219,296 A | 8/1980 | Fujii et al. | |
| 4,223,830 A | 9/1980 | Walton | |
| 4,312,003 A | 1/1982 | Robbins, Jr. | |
| 4,319,674 A | 3/1982 | Riggs et al. | |
| 4,376,936 A | 3/1983 | Kott | |
| 4,407,000 A | 9/1983 | Sasaki et al. | |
| 4,413,254 A | 11/1983 | Pinneo et al. | |
| 4,442,507 A | 4/1984 | Roesner | |
| 4,457,016 A | 6/1984 | Pfeffer | |
| 4,471,345 A | 9/1984 | Barrett, Jr. | |
| 4,476,469 A | 10/1984 | Lander | |
| 4,578,654 A | 3/1986 | Tait | |
| 4,580,041 A | 4/1986 | Walton | |

(Continued)

FOREIGN PATENT DOCUMENTS

AU          2003-244560 A1      10/2003

(Continued)

OTHER PUBLICATIONS

"VTLS RFID Solution" from VTLS Inc. Web site (2 pgs.) dated Sep. 13, 2001.

(Continued)

*Primary Examiner*—Kumiko C Koyama

(57) ABSTRACT

The present invention relates to various methods of collecting and using data from RFID tags associated with items of interest. In one embodiment, the permissible error tolerance associated with the location of an RFID-tagged item may be altered, either manually or automatically. In another embodiment, RFID-tagged items may be associated with certain categories of items, based either on default or user-specified categories.

12 Claims, 4 Drawing Sheets

U.S. PATENT DOCUMENTS

| | | | |
|---|---|---|---|
| 4,583,083 A | 4/1986 | Bogasky | |
| 4,598,276 A | 7/1986 | Tait | |
| 4,636,634 A | 1/1987 | Harper et al. | |
| 4,636,950 A | 1/1987 | Casewll et al. | |
| 4,656,463 A | 4/1987 | Anders et al. | |
| 4,656,592 A | 4/1987 | Spaanenburg et al. | |
| 4,658,357 A | 4/1987 | Carroll et al. | |
| 4,673,932 A | 6/1987 | Ekchian et al. | |
| 4,676,343 A | 6/1987 | Humble et al. | |
| 4,688,026 A | 8/1987 | Scribner et al. | 340/572 |
| 4,745,401 A | 5/1988 | Montean | |
| 4,746,830 A | 5/1988 | Holland | |
| 4,746,908 A | 5/1988 | Montean | |
| 4,785,308 A | 11/1988 | Newcomb | |
| 4,796,074 A | 1/1989 | Roesner | |
| 4,805,232 A | 2/1989 | Ma | |
| 4,814,742 A | 3/1989 | Morita et al. | |
| 4,827,395 A | 5/1989 | Anders et al. | |
| 4,829,297 A | 5/1989 | Lig et al. | |
| 4,831,363 A | 5/1989 | Wolf | |
| 4,835,372 A | 5/1989 | Gombrich et al. | 235/375 |
| 4,837,568 A | 6/1989 | Snaper | |
| 4,850,009 A | 7/1989 | Zook et al. | |
| 4,857,893 A | 8/1989 | Carroll | |
| 4,862,160 A | 8/1989 | Ekchian et al. | |
| 4,870,391 A | 9/1989 | Cooper | |
| 4,873,193 A | 10/1989 | Jensen et al. | |
| 4,879,756 A | 11/1989 | Stevens et al. | |
| 4,881,061 A | 11/1989 | Chambers | |
| 4,924,210 A | 5/1990 | Matsui et al. | |
| 4,924,219 A | 5/1990 | Sato | |
| 4,952,928 A | 8/1990 | Carroll et al. | |
| 4,964,053 A | 10/1990 | Humble | |
| 4,967,185 A | 10/1990 | Montean | |
| 4,973,086 A | 11/1990 | Donnelly et al. | |
| 4,975,828 A * | 12/1990 | Wishneusky et al. | 710/11 |
| 5,008,661 A | 4/1991 | Raj | 340/825 |
| 5,019,815 A | 5/1991 | Lemelson et al. | |
| 5,030,807 A | 7/1991 | Landt et al. | |
| 5,036,308 A | 7/1991 | Fockens | |
| 5,059,951 A | 10/1991 | Kaltner | |
| 5,063,380 A | 11/1991 | Wakura | |
| 5,072,222 A | 12/1991 | Fockens | |
| 5,079,740 A | 1/1992 | Patel et al. | |
| 5,083,112 A | 1/1992 | Piotrowski et al. | |
| 5,095,362 A | 3/1992 | Roesner | |
| 5,099,226 A | 3/1992 | Andrews | |
| 5,099,227 A | 3/1992 | Geiszler et al. | |
| 5,103,222 A | 4/1992 | Hogen Esch et al. | |
| 5,119,070 A | 6/1992 | Matsumoto et al. | |
| 5,124,699 A | 6/1992 | Tervoert et al. | |
| 5,151,684 A | 9/1992 | Johnsen | 340/572 |
| 5,153,842 A | 10/1992 | Dlugos, Sr. et al. | |
| 5,164,985 A | 11/1992 | Nysen et al. | |
| 5,204,526 A | 4/1993 | Yamashita et al. | |
| 5,204,670 A | 4/1993 | Stinton | |
| 5,214,409 A | 5/1993 | Beigel | 340/572 |
| 5,214,410 A | 5/1993 | Verster | |
| 5,218,343 A | 6/1993 | Stobbe et al. | |
| 5,218,344 A | 6/1993 | Ricketts | |
| 5,218,466 A | 6/1993 | Brooks | |
| 5,231,273 A | 7/1993 | Caswell et al. | |
| 5,239,167 A | 8/1993 | Kipp | |
| 5,253,162 A | 10/1993 | Hassett et al. | |
| 5,260,690 A | 11/1993 | Mann et al. | |
| 5,276,431 A | 1/1994 | Piccoli et al. | |
| 5,280,159 A | 1/1994 | Schultz et al. | 231/382 |
| 5,287,414 A | 2/1994 | Foster | |
| 5,288,980 A | 2/1994 | Patel et al. | |
| 5,290,066 A | 3/1994 | Mody | |
| 5,294,781 A | 3/1994 | Takahashi et al. | |
| 5,296,722 A | 3/1994 | Potash et al. | |
| 5,317,309 A | 5/1994 | Vercellotti et al. | |
| 5,327,115 A | 7/1994 | Swierczek | |
| 5,331,313 A | 7/1994 | Koning | |
| 5,334,822 A | 8/1994 | Sanford | 235/385 |
| 5,339,073 A | 8/1994 | Dodd et al. | |
| 5,339,074 A | 8/1994 | Shindley et al. | |
| 5,347,263 A | 9/1994 | Carroll et al. | |
| 5,347,280 A | 9/1994 | Schuermann | |
| 5,353,011 A | 10/1994 | Wheeler et al. | |
| 5,360,967 A | 11/1994 | Perkin et al. | 235/375 |
| 5,369,699 A | 11/1994 | Page et al. | |
| 5,378,880 A | 1/1995 | Eberhardt | |
| 5,382,784 A | 1/1995 | Eberhardt | |
| 5,389,919 A | 2/1995 | Warren et al. | |
| 5,392,028 A | 2/1995 | Pichl | |
| 5,401,584 A | 3/1995 | Minasy et al. | |
| 5,406,263 A | 4/1995 | Tuttle | |
| 5,407,851 A | 4/1995 | Roesner | |
| 5,420,757 A | 5/1995 | Eberhardt et al. | |
| 5,424,858 A | 6/1995 | Gillotte | |
| 5,426,284 A | 6/1995 | Doyle | |
| 5,427,640 A | 6/1995 | Daniels | |
| 5,430,441 A | 7/1995 | Bickley et al. | |
| 5,432,864 A | 7/1995 | Lu et al. | 382/118 |
| 5,434,775 A | 7/1995 | Sims et al. | 364/403 |
| 5,444,223 A | 8/1995 | Blama | |
| 5,446,447 A | 8/1995 | Carney et al. | |
| 5,448,110 A | 9/1995 | Tuttle et al. | |
| 5,448,220 A | 9/1995 | Levy | |
| 5,448,242 A | 9/1995 | Sharpe et al. | |
| 5,450,070 A | 9/1995 | Massar et al. | |
| 5,450,492 A | 9/1995 | Hook et al. | |
| 5,455,410 A | 10/1995 | Schneider | |
| 5,459,657 A | 10/1995 | Wynn et al. | |
| 5,461,390 A | 10/1995 | Hoshen | |
| 5,469,363 A | 11/1995 | Saliga | |
| 5,471,203 A | 11/1995 | Sasaki et al. | |
| 5,477,202 A | 12/1995 | Zarembo et al. | |
| 5,477,215 A | 12/1995 | Mandelbaum | |
| 5,477,863 A | 12/1995 | Grant | |
| 5,489,908 A | 2/1996 | Orthmann et al. | |
| 5,490,079 A | 2/1996 | Sharpe et al. | |
| 5,493,392 A | 2/1996 | Cramer et al. | |
| 5,497,140 A | 3/1996 | Tuttle | |
| 5,499,017 A | 3/1996 | Beigel | |
| 5,500,651 A | 3/1996 | Schuermann | |
| 5,517,195 A | 5/1996 | Narlow et al. | |
| 5,519,381 A | 5/1996 | Marsh et al. | |
| 5,521,601 A | 5/1996 | Kandlur et al. | |
| 5,528,222 A | 6/1996 | Moskowitz et al. | |
| 5,528,251 A | 6/1996 | Frein | |
| 5,537,105 A | 7/1996 | Marsh et al. | |
| 5,539,193 A | 7/1996 | Gibbs et al. | |
| 5,539,394 A | 7/1996 | Cato et al. | |
| 5,539,775 A | 7/1996 | Tuttle et al. | |
| 5,541,585 A | 7/1996 | Duhame et al. | |
| 5,541,604 A | 7/1996 | Meier | |
| 5,550,547 A | 8/1996 | Chan et al. | |
| 5,554,974 A | 9/1996 | Brady et al. | |
| 5,565,846 A | 10/1996 | Geiszler et al. | |
| 5,565,858 A | 10/1996 | Guthrie | |
| 5,573,611 A | 11/1996 | Koch et al. | |
| 5,574,372 A | 11/1996 | Moritz et al. | |
| 5,581,707 A | 12/1996 | Keucken | |
| 5,589,820 A | 12/1996 | Robinson et al. | |
| 5,602,527 A | 2/1997 | Suenaga | |
| 5,602,538 A | 2/1997 | Orthmann et al. | |
| 5,604,486 A | 2/1997 | Lauro et al. | |
| 5,610,596 A | 3/1997 | Petitclerc | 340/825 |
| 5,613,228 A | 3/1997 | Tuttle et al. | |
| 5,616,906 A | 4/1997 | Kumar | |
| 5,625,341 A | 4/1997 | Giles et al. | |

| | | | | | | |
|---|---|---|---|---|---|---|
| 5,629,981 A | 5/1997 | Nerlikar | | 6,078,251 A | 6/2000 | Landt et al. ............... 340/10.41 |
| 5,633,678 A * | 5/1997 | Parulski et al. ........... 348/231.5 | | 6,078,258 A | 6/2000 | Auerbach et al. |
| 5,635,693 A | 6/1997 | Benson et al. ............... 235/384 | | 6,079,890 A | 6/2000 | Gross et al. |
| 5,635,906 A | 6/1997 | Joseph | | 6,084,528 A | 7/2000 | Beach et al. ................. 340/825 |
| 5,635,917 A | 6/1997 | Todman | | 6,085,907 A | 7/2000 | Hochmeister et al. |
| 5,640,002 A | 6/1997 | Ruppert et al. ............... 235/472 | | 6,097,301 A | 8/2000 | Tuttle |
| 5,646,592 A | 7/1997 | Tuttle | | 6,100,804 A | 8/2000 | Bardy et al. |
| 5,648,765 A | 7/1997 | Cresap et al. | | 6,104,311 A | 8/2000 | Lastinger |
| 5,651,548 A | 7/1997 | French et al. | | 6,104,333 A | 8/2000 | Wood, Jr. |
| 5,661,473 A | 8/1997 | Paschal | | 6,107,920 A | 8/2000 | Eberhardt et al. |
| 5,668,803 A | 9/1997 | Tymes et al. | | 6,127,928 A * | 10/2000 | Issacman et al. ......... 340/572.1 |
| 5,673,037 A | 9/1997 | Cesar et al. ................. 340/825 | | 6,137,411 A | 10/2000 | Tyren |
| 5,682,142 A | 10/1997 | Loosmore et al. ........... 340/572 | | 6,137,928 A | 10/2000 | Issacman et al. |
| 5,682,143 A | 10/1997 | Brady et al. | | 6,141,649 A | 10/2000 | Bull |
| 5,686,902 A | 11/1997 | Reis et al. | | 6,142,375 A | 11/2000 | Belka et al. |
| 5,689,238 A | 11/1997 | Cannon, Jr. et al. ......... 340/568 | | 6,148,291 A * | 11/2000 | Radican ....................... 705/28 |
| 5,689,239 A | 11/1997 | Turner et al. | | 6,150,921 A | 11/2000 | Werb et al. |
| 5,691,724 A | 11/1997 | Aker et al. | | 6,150,948 A | 11/2000 | Watkins |
| 5,694,139 A | 12/1997 | Saito et al. | | 6,154,137 A | 11/2000 | Goff et al. .................... 340/572 |
| 5,705,818 A | 1/1998 | Kelbel et al. | | D435,557 S | 12/2000 | Eisenberg et al. |
| 5,708,423 A | 1/1998 | Ghaffari et al. ............. 340/825 | | 6,169,483 B1 | 1/2001 | Ghaffari et al. |
| 5,717,867 A | 2/1998 | Wynn et al. | | 6,172,608 B1 | 1/2001 | Cole |
| 5,729,697 A | 3/1998 | Schkolnick et al. | | 6,173,900 B1 | 1/2001 | Yoshigi et al. |
| 5,739,765 A | 4/1998 | Stanfield et al. | | 6,176,425 B1 * | 1/2001 | Harrison et al. ............. 235/385 |
| 5,745,036 A | 4/1998 | Clare | | 6,182,053 B1 | 1/2001 | Rauber et al. ................. 705/28 |
| 5,751,221 A | 5/1998 | Stanfield et al. ............. 340/825 | | 6,185,165 B1 | 2/2001 | Jesionowski et al. |
| 5,751,257 A | 5/1998 | Sutherland | | 6,195,006 B1 * | 2/2001 | Bowers et al. ........... 340/572.1 |
| 5,768,140 A | 6/1998 | Swartz et al. | | 6,201,474 B1 | 3/2001 | Brady et al. |
| 5,769,051 A | 6/1998 | Bayron et al. | | 6,203,262 B1 | 3/2001 | Frich et al. |
| 5,771,003 A | 6/1998 | Seymour | | 6,204,764 B1 | 3/2001 | Maloney |
| 5,777,884 A | 7/1998 | Belka et al. | | 6,218,942 B1 | 4/2001 | Vega et al. |
| 5,780,305 A | 7/1998 | Chisum | | 6,232,870 B1 | 5/2001 | Garber et al. ............... 340/10.1 |
| 5,785,181 A | 7/1998 | Quartararo, Jr. | | 6,232,876 B1 | 5/2001 | Maloney |
| 5,786,764 A | 7/1998 | Engellenner | | 6,240,091 B1 | 5/2001 | Ginzboorg et al. |
| 5,793,305 A | 8/1998 | Turner et al. | | 6,244,512 B1 | 6/2001 | Koenck et al. ............... 235/472 |
| 5,794,213 A * | 8/1998 | Markman ..................... 705/23 | | 6,260,049 B1 | 7/2001 | Fitzgerald et al. |
| 5,798,693 A | 8/1998 | Engellenner | | 6,261,247 B1 | 7/2001 | Ishikawa et al. |
| 5,799,302 A | 8/1998 | Johnson et al. | | 6,269,572 B1 | 8/2001 | Forsythe et al. |
| 5,804,810 A | 9/1998 | Woolley et al. ............. 235/492 | | 6,317,028 B1 | 11/2001 | Valiulis |
| 5,805,065 A | 9/1998 | Schwarz et al. | | 6,318,636 B1 * | 11/2001 | Reynolds et al. ........ 235/472.01 |
| 5,808,558 A | 9/1998 | Meek et al. | | 6,324,437 B1 | 11/2001 | Frankel et al. |
| 5,814,797 A | 9/1998 | Rifkin | | 6,330,971 B1 * | 12/2001 | Mabry et al. ................. 235/383 |
| 5,821,513 A | 10/1998 | O'Hagan et al. | | 6,335,686 B1 | 1/2002 | Goff et al. |
| 5,822,714 A | 10/1998 | Cato ........................... 702/108 | | 6,338,149 B1 | 1/2002 | Ciccone, Jr. et al. |
| 5,831,533 A | 11/1998 | Kanno | | 6,342,839 B1 | 1/2002 | Curkendall et al. |
| 5,842,118 A | 11/1998 | Wood, Jr. | | 6,343,695 B1 | 2/2002 | Petrick et al. |
| 5,844,523 A | 12/1998 | Brennan et al. | | 6,354,493 B1 * | 3/2002 | Mon .......................... 235/380 |
| 5,850,187 A | 12/1998 | Carrender et al. ........... 340/825 | | 6,362,738 B1 | 3/2002 | Vega |
| 5,859,587 A | 1/1999 | Alicot et al. | | 6,369,709 B1 | 4/2002 | Larson et al. |
| 5,886,634 A | 3/1999 | Muhme | | 6,400,997 B1 | 6/2002 | Rapp, III |
| 5,887,176 A | 3/1999 | Griffith et al. | | 6,407,669 B1 | 6/2002 | Brown et al. |
| 5,907,522 A | 5/1999 | Teodoridis et al. | | 6,411,211 B1 * | 6/2002 | Boley et al. ................ 340/568.6 |
| 5,920,053 A * | 7/1999 | DeBrouse ................... 235/375 | | 6,422,457 B1 | 7/2002 | Frich et al. |
| 5,920,261 A | 7/1999 | Hughes et al. ............... 340/572 | | 6,424,262 B2 | 7/2002 | Garber et al. |
| 5,923,001 A | 7/1999 | Morris et al. | | 6,448,886 B2 | 9/2002 | Garber et al. |
| 5,929,780 A | 7/1999 | Pagnol et al. | | 6,456,239 B1 * | 9/2002 | Werb et al. ................... 342/463 |
| 5,929,801 A | 7/1999 | Aslanidis et al. | | 6,480,100 B1 | 11/2002 | Frieden |
| 5,936,527 A | 8/1999 | Isaacman et al. | | 6,486,780 B1 | 11/2002 | Garber et al. |
| 5,938,727 A | 8/1999 | Ikeda | | 6,496,806 B1 | 12/2002 | Horwitz et al. |
| 5,939,984 A | 8/1999 | Brady et al. | | 6,535,129 B1 | 3/2003 | Petrick |
| 5,955,951 A | 9/1999 | Wischerop et al. | | 6,538,623 B1 | 3/2003 | Pamian et al. |
| 5,959,568 A | 9/1999 | Woolley | | 6,570,492 B1 | 5/2003 | Peratoner |
| 5,963,134 A | 10/1999 | Bowers et al. ............... 340/572 | | 6,600,418 B2 | 7/2003 | Francis et al. |
| 5,991,742 A | 11/1999 | Tran | | 6,600,420 B2 | 7/2003 | Goff et al. |
| 5,995,017 A | 11/1999 | Marsh et al. | | 6,608,551 B1 | 8/2003 | Anderson et al. |
| 6,002,344 A | 12/1999 | Bandy et al. | | 6,614,721 B2 | 9/2003 | Bokhour |
| 6,025,780 A | 2/2000 | Bowers et al. | | 6,646,554 B1 | 11/2003 | Goff et al. |
| 6,032,127 A | 2/2000 | Schkolnick et al. ........... 705/23 | | 6,704,690 B2 | 3/2004 | Koh et al. |
| 6,037,879 A | 3/2000 | Tuttle | | 6,714,121 B1 | 3/2004 | Moore |
| 6,056,199 A | 5/2000 | Wiklof et al. ............... 235/462 | | 6,744,367 B1 | 6/2004 | Forster |
| 6,057,756 A | 5/2000 | Engellenner | | 6,749,116 B2 | 6/2004 | Massaro |
| 6,074,156 A * | 6/2000 | Frich ....................... 414/331.01 | | 6,753,830 B2 | 6/2004 | Gelbman |
| 6,075,441 A | 6/2000 | Maloney | | 6,774,782 B2 | 8/2004 | Runyon et al. |

| | | | | |
|---|---|---|---|---|
| 6,819,222 B2 * | 11/2004 | Lin et al. ............... 340/10.31 | GB | 2 257 278 A | 1/1993 |
| 6,888,509 B2 | 5/2005 | Atherton | GB | 2288299 | 11/1995 |
| 6,934,718 B2 * | 8/2005 | Davidsson ............... 707/104.1 | GB | 2 306 726 A | 5/1997 |
| 7,044,373 B1 | 5/2006 | Garber et al. | GB | 2308947 | 7/1997 |
| 7,069,100 B2 | 6/2006 | Monette et al. | JP | 56-110193 | 9/1981 |
| 7,270,268 B2 | 9/2007 | Garber et al. | JP | 2-301893 | 12/1990 |
| 2001/0000019 A1 | 3/2001 | Bowers et al. | JP | 04047995 | 2/1992 |
| 2001/0000958 A1 | 5/2001 | Ulrich et al. | JP | 4-255090 | 9/1992 |
| 2001/0008390 A1 * | 7/2001 | Berquist et al. ........... 340/10.31 | JP | 5-20404 | 1/1993 |
| 2002/0008621 A1 * | 1/2002 | Barritz et al. ............ 340/572.1 | JP | 5-55160 | 3/1993 |
| 2002/0041234 A1 | 4/2002 | Kuzma et al. | JP | 5-266267 | 10/1993 |
| 2002/0064776 A1 | 5/2002 | Liu | JP | 05-336034 | 12/1993 |
| 2002/0070862 A1 | 6/2002 | Francis et al. | JP | 6-84024 | 3/1994 |
| 2002/0083025 A1 | 6/2002 | Robarts et al. | JP | 7-13325 | 3/1995 |
| 2002/0104013 A1 | 8/2002 | Ghazarian | JP | 7-110874 A | 4/1995 |
| 2002/0111819 A1 | 8/2002 | Li et al. | JP | 7-150835 | 6/1995 |
| 2002/0113707 A1 | 8/2002 | Grunes et al. | JP | 07254092 | 10/1995 |
| 2002/0167406 A1 | 11/2002 | Garber et al. | JP | 7-325870 A | 12/1995 |
| 2002/0185532 A1 | 12/2002 | Berquist et al. | JP | 8-55160 | 2/1996 |
| 2002/0188702 A1 | 12/2002 | Short, III et al. | JP | 8054462 | 2/1996 |
| 2002/0190862 A1 * | 12/2002 | Berquist et al. .......... 340/572.1 | JP | 8-108911 | 4/1996 |
| 2002/0194208 A1 | 12/2002 | Knoll et al. | JP | 8-153172 | 6/1996 |
| 2002/0196126 A1 | 12/2002 | Eisenberg et al. | JP | 8-180152 | 7/1996 |
| 2003/0018534 A1 | 1/2003 | Zack et al. | JP | 10-024686 | 1/1998 |
| 2003/0206107 A1 | 11/2003 | Goff et al. | JP | 10-181261 | 7/1998 |
| | | | JP | 63-200909 | 12/1998 |
| FOREIGN PATENT DOCUMENTS | | | JP | 11-39522 | 2/1999 |
| | | | JP | 2000306188 | 11/2000 |
| CA | 2 205 213 | 11/1997 | JP | 2001-028510 | 1/2001 |
| CN | 1265215 | 8/2000 | JP | 2001-31218 | 2/2001 |
| CN | 1293732 A | 5/2001 | JP | 2001-216546 A | 8/2001 |
| CN | 1315027 | 9/2001 | JP | 2001-229263 | 8/2001 |
| DE | 43 19 878 A1 | 12/1993 | NL | 9400091 | 9/1995 |
| DE | 44 15 801 A1 | 9/1994 | WO | 89/04016 | 5/1989 |
| DE | 43 41 880 A1 | 6/1995 | WO | WO 89/04016 A1 | 5/1989 |
| DE | 198 56 762 | 5/2000 | WO | 90/05968 | 5/1990 |
| DE | 198 56 763 | 6/2000 | WO | 94/22580 | 10/1994 |
| DE | 19844631 | 6/2000 | WO | 95/12870 | 5/1995 |
| DE | 200 13 622 U1 | 7/2000 | WO | 96/41296 | 12/1996 |
| DE | 19921748 | 11/2000 | WO | 97/15031 | 4/1997 |
| DE | 199 21 748 A1 | 11/2003 | WO | 97/29464 | 8/1997 |
| EP | 0 301 127 | 2/1989 | WO | 97/36270 | 10/1997 |
| EP | 0357309 | 3/1990 | WO | 97/50057 | 12/1997 |
| EP | 0 494 114 B1 | 7/1992 | WO | WO 97/49972 | 12/1997 |
| EP | 0 526 038 A1 | 2/1993 | WO | 98/13800 | 4/1998 |
| EP | 0 585 132 A1 | 3/1994 | WO | 98/13804 | 4/1998 |
| EP | 0 598 624 A1 | 5/1994 | WO | 98/13805 | 4/1998 |
| EP | 0 615 285 A2 | 9/1994 | WO | 98/16070 | 4/1998 |
| EP | 0 637 093 A1 | 2/1995 | WO | 98/16849 | 4/1998 |
| EP | 0 689 151 A2 | 12/1995 | WO | WO 98/13800 | 4/1998 |
| EP | 0 689 161 A2 | 12/1995 | WO | 98/27670 | 6/1998 |
| EP | 0 702 323 A2 | 3/1996 | WO | WO 98/35327 | 8/1998 |
| EP | 0 710 853 A2 | 5/1996 | WO | 98/58238 | 12/1998 |
| EP | 0 740 262 A2 | 10/1996 | WO | 98/59258 | 12/1998 |
| EP | 0740262 | 10/1996 | WO | 99/05659 | 2/1999 |
| EP | 0 747 990 A1 | 12/1996 | WO | 99/05660 | 2/1999 |
| EP | 0 762 535 A1 | 3/1997 | WO | WO 99/05660 | 2/1999 |
| EP | 0 794 507 A2 | 9/1997 | WO | 99/10839 | 3/1999 |
| EP | 0794507 | 9/1997 | WO | 99/64974 | 12/1999 |
| EP | 0 794 507 A2 | 11/1997 | WO | 99/65006 | 12/1999 |
| EP | 0 805 507 A1 | 11/1997 | WO | 00/10112 | 2/2000 |
| EP | 0 810 567 A1 | 12/1997 | WO | 00/10144 | 2/2000 |
| EP | 0 825 672 A2 | 2/1998 | WO | WO 00/10122 | 2/2000 |
| EP | 0 944 085 A2 | 9/1999 | WO | WO 00/10144 | 2/2000 |
| EP | 0997842 | 5/2000 | WO | 00/16280 | 3/2000 |
| EP | 1 033 675 A2 | 9/2000 | WO | 00/43805 | 7/2000 |
| EP | 1 139 278 A2 | 10/2001 | WO | 00/65532 | 11/2000 |
| FR | 2 555 339 A | 5/1985 | WO | 00/77704 A2 | 12/2000 |
| FR | 2 701 146 A1 | 8/1994 | WO | 01/03058 A1 | 1/2001 |
| GB | 2 098 768 A | 11/1982 | WO | 01/26048 | 4/2001 |
| GB | 2 186 467 A | 8/1987 | WO | 01/52179 | 7/2001 |
| GB | 2 204 162 | 11/1988 | WO | 01/57807 | 8/2001 |
| GB | 2 204 162 A | 11/1988 | WO | 01/90849 A2 | 11/2001 |

| | | |
|---|---|---|
| WO | 02/073512 A1 | 9/2002 |
| WO | WO 02/099715 A1 | 12/2002 |

OTHER PUBLICATIONS

"Automated Library Management System"; IBM Technical Disclosure Bulletin, Mar. 1992; (2 pgs.).
Herdeen, Frederick et al.; "Get a lock on inventory"; Security Management; Arlington; Oct. 1996 (6 pgs.).
Finkenzeller; "RFID Handbook—Radio-Frequency Identification Fundamentals and Applications"; 1999; pp. 227-273.
"VTLS RFID Solution" from VTLS Inc. Website (2 pgs.) dated Sep. 13, 2001.
"Auto ID . . . putting the control in inventory control", Industrial Engineering, Norcross, Aug. 1994, Hornak, J.P. (2 pages).
"Automated Library Management System" IBM Technical Disclosure Bulletin, Mar. 1992, pp. 311-312.
"Chandler Library 3$^{rd}$ in Valley to Use Checkout by Machine", Arizona Republic, May 13, 1996, Roberto Sanchez, (2 pages).
"In Oakland County: New library computer eases work for staff, lets kids help themselves to titles", Detroit News, Detroit, Michigan, Oct. 25, 1996, Douglas Ilka (2 pages).
"Intelligent Tagging", Retail Business, New York, Dec. 1994, (1 page).
"Librarians Become 'Cyberian'", Roanoke Times & World News, Apr. 17, 1996, Kathy Loan (2 pages).
"Library trying self check-out Staff isn't need to help patron", Milwaukee Journal Sentinel, Oct. 5, 1995, Eugene Baer (2 pages).
"Tammany Libraries Turn Page On Old-Fashioned Checkout", Times — Picayune, Aug. 25, 1995, Phil White, (2 pages).
Abstract for R. Langen: RF/ID Streamlines Circuit Board Assembly (ID Systems European Edition, vol. 1, No. 3, Fall 1993, pp. 19-20).
Abstract for R.J. Marker: The Role and Function of the Shelflist in an Automated Library Environment (Technical Services Quarterly, vol. 14, No. 1, 1996, pp. 33-48).
Article entitled "Never lose a file again" Findentity® RF in cooperation with X-ident, Texas Instruments and Leitz (6 pgs.) Date Unknown.
Article from web of IDSystems entitled "RFID: What's It Worth to You?" (6 pgs. ) dated Sep. 1999 (printed Feb. 15, 2001).
Diskette and index entitled, "Data Transfer Software IBM PC — Version 2.20b" from id Systems Ltd. (3 diskettes). Date Unknown.
Document entitled "RFID Tag API Specification 16 and 32 Bit Versions — User Guide: Version 3.00" from id Systems Ltd. (38 pages). Date Unknown.
Document entitled, "Data Transfer Software — User Guide: Version 2.11" from id Systems Ltd. (19 pages). Date Unknown.
Document entitled, "Flexiscan Product Range — User Guide: Version 1.10" from id Systems Ltd. (22 pages). Date Unknown.
Document entitled, "OEM read/write board — Philips Semiconductors I-CODE — Texas Instruments Tag-it — User Guide: Version 1.10" from id Systems Ltd. (14 pages). Date Unknown.
Document entitled, "RS232 Communication Protocol — User Guide: Version 3.10" from id Systems Ltd. (34 pages). Date Unknown.
European Search Report, EP Appl. No. 06026302.7 Date: Feb. 19, 2007.
European Search Report, EP Appl. No. 06026303 Date: Apr. 23, 2007.
European Search Report, EP Appl. No. 06026304 Date: Feb. 23, 2007.
Finkenzeller, Klaus, "RFID Handbook - Radio-Frenquency Indentification Fundamentals and Applicators" Chapter 13 - Example Applications; (pp. 227-273) 1999.
Flyer entitled, "Combined Anti-Theft and RF Programmable Tag" from ISD (RF/ID) Ltd. Date Unknown.
Herdeen, Frederick et al., "Get a lock on inventory"; Security Management Arlington; Oct. 1996 (6 pgs.).
HID Corp. Press Release entitled, IBM Introduces Notebook PCs with HID's Proxtrak™ Technology (2 pgs.) dated Feb. 15, 2001.
Information Brief: Asset ID of IBM dated May 2000 (6 pgs.).
Information from Internet entitled, "Performa® Portable Reader" from Checkpoint Meto, printed Jun. 13, 2001 (2 pages).
Jeff Hedlund et al., "SmartBookcase" (2 pages) dated Sep. 13, 2001.
John Bowers, "Road to intelligent tagging is pave with opportunities", Automatic I.D. News, Oct. 1995, pp. 86-87.
Page description entitled, "Asset tagging nears reality", Security, vol. 31, No. 8, pp. 41- 42, Aug. 1994.
Page description entitled, "Self-issue and self-return system selection and performance at the University of Sunderland", Vine, No. 105, pp. 14-19, 1996.
Page description entitled, "The self-service library", Library Technology News, No. 20, pp. 4-8, Nov. 1995.
Web article from AXCESS Inc. Products entitled: Wireless Automatic ID: Overview (4 pgs.) dated Feb. 15, 2001.
Web article from Porter Lee Corporation entitled, "Crime Fighter Beast - Police Evidence Tracking System" (3pgs.) printed Dec. 10, 2001.

* cited by examiner

RFID DATA COLLECTION AND USE

TECHNICAL FIELD

The invention relates to the collection and use of data using radio frequency identification tags.

BACKGROUND OF THE INVENTION

Radio frequency identification (RFID) has been proposed for use in a number of applications in which an RFID tag is attached to an item and subsequently interrogated or read to obtain information regarding that item. For example, PCT Publication Nos. WO 00/10144 and WO 00/10122 describe various functions and applications for RFID systems, and exemplify the use of RFID tags in libraries. U.S. Pat. No. 5,963,134 also describes certain uses for RFID systems in libraries and for other applications. The present invention is related to the collection and management of data using RFID tags and systems.

SUMMARY OF THE INVENTION

The present invention relates to certain aspects of the collection and use of data obtained by interrogating RFID tags, each of which is associated with an item of interest, using an RFID reader. In some embodiments it is preferred to use a portable, and preferably, a handheld RFID reader to interrogate the RFID-tagged items. In general terms, the present invention relates to data collection and categories, notification during interrogation, inventory, background inventory, real-time inventory reconciliation, altering the permissible error tolerance, and conversion of non-RFID-tagged items to RFID-tagged items. The items may be, for example, assets, evidence, goods in warehouse, distribution, or commercial, retail, or storage facilities, pallets or storage containers, documents, files (including patient or client files and records), and mail (including envelopes and packages).

BRIEF DESCRIPTION OF THE DRAWING

Certain embodiments of the present invention are illustrated in the appended Figures.

DETAILED DESCRIPTION OF THE INVENTION

1. General RFID Information

Figure 1:
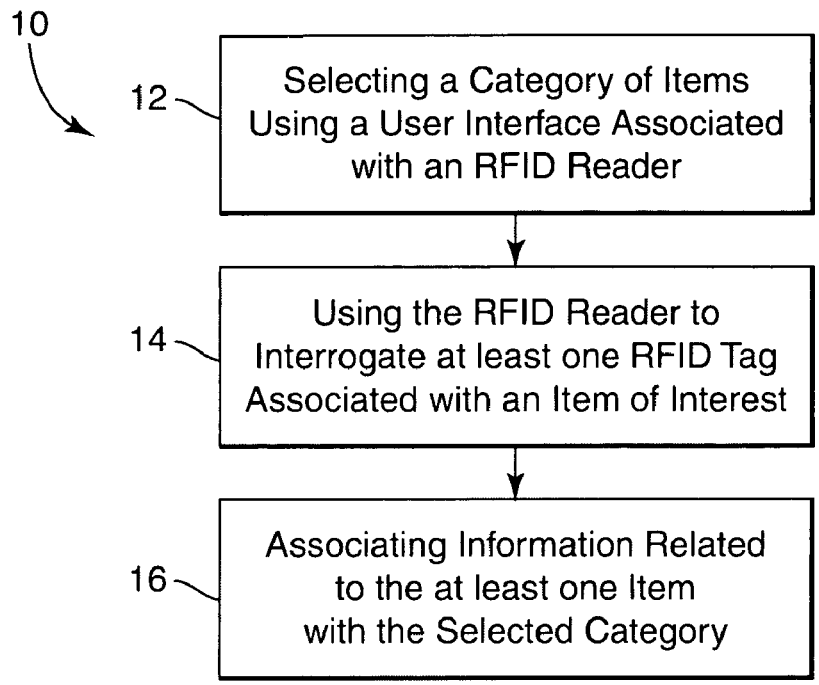
FIG. 1 illustrates one example of a method of collecting information related to RFID tags associated with items of interest.

RFID tags and readers for such tags are well known in the art. For example, RFID tags are available from Texas Instruments Company of Dallas, Tex. under the designation "Tag-It," and readers are also available from Texas Instruments under the designation "Commander," among others. One particularly useful embodiment of an RFID reader is described in U.S. Pat. No. 6,232,870 (Garber et al.), in which a portable integrated RFID reader includes an antenna, a computer, a display, and an RFID reader for interrogating RFID tags. The contents of U.S. Pat. No. 6,232,870, PCT Publication No. WO 00/10122, and PCT Publication No. WO 00/10144 are hereby incorporated by reference herein. The present invention is related to methods of using RFID readers to obtain information from RFID tags, and to methods of using that information once obtained. These and other aspects of the invention are described in more detail below.

One useful function of an RFID reader is for the collection of data. That is, when an RFID reader interrogates an RFID tag, information related to the item with which the tag is associated is collected and stored in a database. The database may reside in the memory of the RFID reader, in a removable data storage device (such as a flash memory card) associated with the RFID reader, in the memory of another device such as a computer, or in more than one of these locations. The RFID reader may be a portable reader of the type described above or in the '870 patent, or it may be a component of another device such as one that checks items into and out of inventory, or one that converts bar-coded or other identified items to RFID-tagged items by obtaining information about the item and then providing an RFID tag that is associated with that item.

Certain aspects of the present invention may be exemplified in a library environment, where RFID systems may be particularly useful. The scope of the invention is not limited to libraries, however, and can be used in other suitable environments including but not limited to the tracking of assets, evidence, goods in warehouse, distribution, commercial, retail, or storage facilities, pallets or storage containers, documents, files (including patient or client files and records), and mail (including envelopes and packages). In light of the disclosure of the invention provided herein, these and other uses of the invention will be apparent to persons of ordinary skill in the art.

2. Data Collection and Categories

In one aspect of the present invention, data can be collected and sorted into categories for storage in a database. A category, as that term is used herein, is a group of items that possess specified attributes, and represents only a portion (though perhaps a major portion) of an entire group of RFID-tagged items. The RFID reader may be provided with certain default categories believed to be of interest to the user, or the user may define the attributes of items that fall within a category or categories. For example, if the user uses the RFID reader in a library, the default categories may be locations within the library (reference, non-fiction, or fiction), or types of items (books, periodicals, audio/video, etc.). Defined or customized categories could include those for items that are believed to have been used in a certain manner (such as used inside the library but not checked out, or used for classroom or program purposes, or in connection with audio or video players), or other categories designed by a user for a specific application. These categories may be defined for or provided to the RFID reader through a user interface such as a display having data entry capabilities, or by uploading from a removable data storage medium, or by uploading from a computer database that is linked (for example by wire, docking station, or wirelessly) to the RFID reader.

Once certain categories have been selected or defined, the RFID reader may be used to interrogate RFID tags associated with items of interest. The categorization may be done in several ways. A first way of categorizing RFID-tagged items is to select (for example, from a list of categories displayed for the user) or define a category, interrogate RFID tags associated with items of interest, and then save the information obtained from those RFID tags within the selected or defined category in a database. This associates the RFID-tagged items with the category or categories. The user can then continue to interrogate RFID tags associated with items in that category, or switch to another category. As an example, a user in a library may select or define a category for "used inside library but not checked out," then interrogate RFID tags associated with items left by users inside the library, and then save that information within the "in-house use" category on a database. If the user then wishes to change categories, the user may select or define another category ("used in children's reading room," for example), and then interrogate items and save them within that category on a database. The database can be one stored within the memory of the RFID reader, on a removable data storage device (such as a flash memory card) associated with the RFID reader, within memory associated with a separate computer or other device, or the like.

One example of a method 10 of collecting information related to RFID tags associated with items of interest is illustrated in FIG. 1 in a flow chart diagram. Method 10 includes step 12 of selecting a category of items using a user interface associated with an RFID reader. Method 10 also includes step 14 of using the RFID reader to interrogate at least one RFID tag associated with an item of interest. Method 10 also includes step 16 of associating information related to the at least one item with the selected category.

A second way of categorizing RFID-tagged items is to select or define at least two categories, use an RFID reader to interrogate at least one RFID-tagged item, and then to associate that item with one or more of the categories. That is, categories may be created for different types of items, or for items having a different inventory status (present and absent, for example), or for items that have been recently interrogated (and thus may be a frequently used item) or not. The RFID-tagged items may be categorized in none, one, or more than one of the categories, depending on whether or not each item has the attributes of the items to be categorized in each respective category. The categories may be mutually exclusive (meaning that every RFID-tagged item may be categorized in only one category) or not.

A third way of categorizing RFID-tagged items is to select at least one category of items; interrogate RFID tags associated with items, at least one of which is within the category of items; and associate the RFID-tagged items with the appropriate category. That is, the RFID reader would associate items that have certain attributes with a certain category, and ignore any item that does not have those attributes. Thus if a user were only interested in items having certain characteristics, the RFID reader could create a list of only those items, without listing or categorizing any other items that didn't have the specified characteristics. For example, if a user in a library were only interested in obtaining information from items of a certain type, such as reference texts, a category for reference texts could be created, RFID-tagged items interrogated, and only reference texts categorized in that category. The information necessary to categorize each RFID-tagged item (in this and other embodiments) may be obtained from the RFID tag itself, or from a database that includes a record related to that RFID tag and/or the item, such as a database stored in memory associated with the RFID reader. That memory may be integral, or may be a removable data storage device, such as a flash memory card.

3. Notification During Interrogation

During data collection, the RFID reader may provide audible and/or visual feedback to indicate (a) when the RFID reader is reading tags, (b) when the RFID reader detects an item that is on a list of predetermined items, and/or (c) when the RFID reader detects an RFID tag that does not match an entry on an existing database. For example, a lighted indicator may indicate when RFID tags are being interrogated successfully, an audible signal may indicate that an item that is on a list of predetermined items has been detected, or a signal, such as a light or an audible sound, may also indicate that an RFID tag has been interrogated that does not match an entry on an existing database of items. The signal may also be provided on a user interface, such as a display, and that user interface may enable the user to create a database record for the item, and/or enter information related to the item. For example, the user interface may include a touch panel display and/or an actual or simulated keyboard, through which a user can create a database record for the item, and/or enter information through the user interface that describes the type of item, its name or title, an item identifier of some type, or other information.

Figure 2:
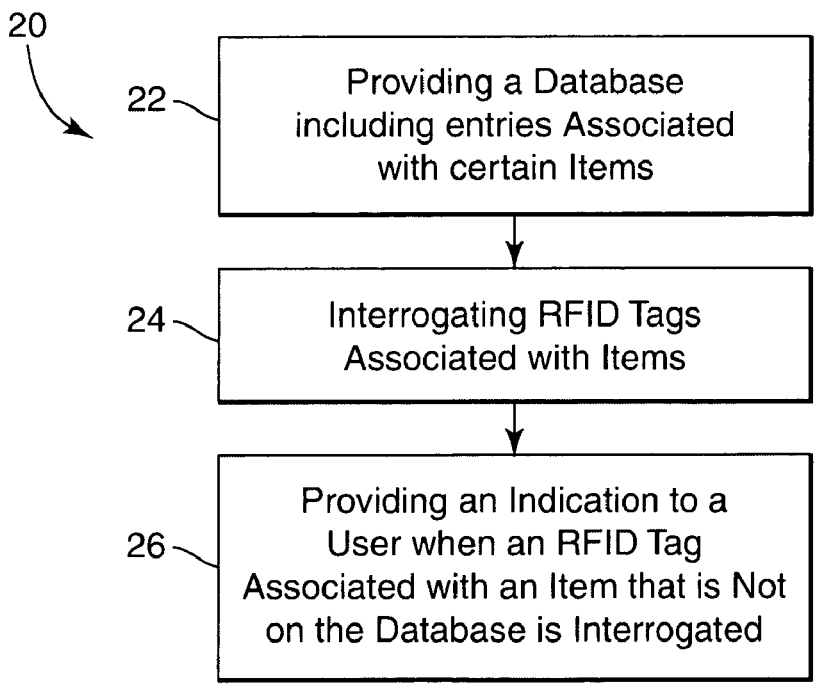
FIG. 2 illustrates one example of a method of identifying items associated with RFID tags.

One example of a method 20 of identifying items associated with RFID tags is illustrated in FIG. 2 in a flow chart diagram. Method 20 includes step 22 of providing a database including entries associated with certain items. Method 20 also includes step 24 of interrogating RFID tags associated with items. Method 20 also includes step 26 of providing an indication to a user when an RFID tag associated with an item that is not on the database is interrogated.

4. Inventory

It may also be useful to conduct inventory using an RFID reader and RFID tags associated with items of interest. The RFID reader collects information related to the items by interrogating the RFID tags associated with the items. However, if this information is simply listed in a database in the order that the items were interrogated, then if a single item is out of place by, for example, 1000 items, then when that "interrogation list" is compared against a predetermined ordered list, the result may indicate that the intervening 1000 items are out of position by at least one place. For example, if in a library a book is out of position because it is 1000 books to the left of its proper position, then the interrogated list may indicate that the 1000 intervening books are all out of position. This may result in a paper printout or a data listing that is inconveniently large, and thus of little use to a user. Also, some users are not concerned about items that are out of position by only a few positions. This can be fairly common and doesn't typically present a problem for someone who is searching for the item, because the item is sufficiently near its expected location. A standard inventory report, however, may list all items that are out of position at all, even those only out of order by a small amount.

There are other devices, such as handheld RFID readers, that report errors in storage locations for items. For those who use such a device, an inventory report that describes errors in location as well as the presence or absence of items may not be useful. Those users may prefer to focus on other categories of information in their reports, such as items that are missing.

To overcome these potential difficulties, when an inventory report includes out-of-order information that is erroneous or not desired, a method is provided whereby the RFID tags associated with items of interest are interrogated, then the data is placed in order according to their expected order (which may be referred to as an algorithm order), and then compared against the ordered list of items (or a list of items in algorithm order). This comparison enables a processor to determine which items that the RFID reader was expected to interrogate are missing, and which items that the RFID reader was not expected to interrogate (because a database indicates that they were not present) are present. The resulting lists of (unexpectedly) missing and (unexpectedly) present items, for example, are typically of a usable length, and accordingly, overcome the difficulties described above.

In this and other applications, the order may be conventional in relationship to the items about which information is being sought (such as the Dewey Decimal system or the Library of Congress system for library materials), or may be designated by the user. Any or all of the lists described may be saved in a database, which may reside in the memory of a computer associated with the RFID reader, or on a removable data storage medium associated with the RFID reader, or in memory associated with a separate computer or device. Alternatively, the information from the RFID tags may simply be collected, and may be placed in the desired order at a later time or by a different computer, or both, either before or after the information has been stored in a database.

Figure 3:
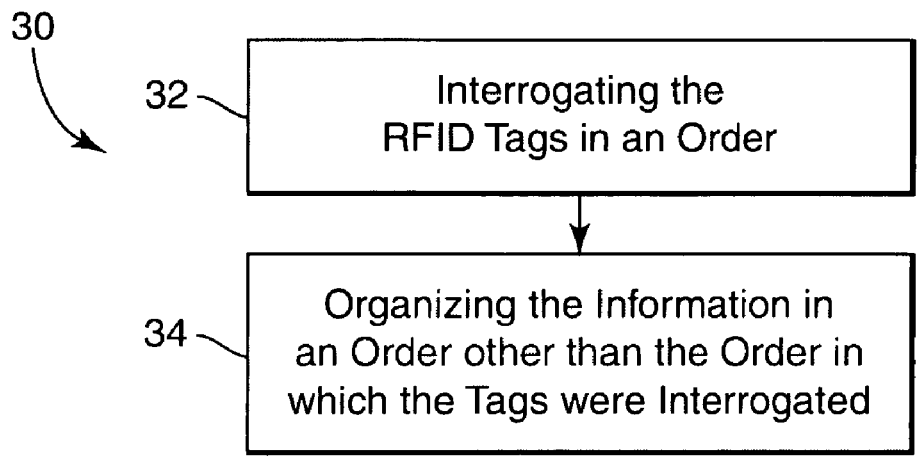
FIG. 3 illustrates one example of a method of obtaining information related to items associated with RFID tags.

One example of a method 30 of obtaining information related to items associated with RFID tags is illustrated in FIG. 3 in a flow chart diagram. Method 30 includes step 32 of interrogating the RFID tags in an order. Method 30 also includes step 34 of organizing the information in an order other than the order in which the tags were interrogated.

5. Background Inventory

In another embodiment of the present invention, inventory may be conducted simultaneously with other operations of the RFID system. That is, it is known to conduct inventory of RFID-tagged items by interrogating the items for that purpose. In this embodiment of the present invention, inventory is conducted as a background operation of the RFID system, using data acquired for a different purpose. For example, a portable RFID reader may be used to interrogate items in a storage area to determine whether they are located in the proper order, location, or both, or whether they are present on a list of items in which the user is interested. This would be the primary purpose of the RFID interrogation, but the information obtained regarding those items may also be used to conduct inventory. That is, each RFID-tagged item that is interrogated to determine whether it is in the proper order relative to adjacent items is necessarily also present in the storage area, and thus an inventory database can be consulted and updated, as needed, to reflect the fact that the item is present. This background inventory operation may also be used with other RFID hardware, such as check-in/check-out devices, conversion stations (for converting items without RFID tags to items with RFID tags, the tags being associated with the items), or other such devices. In those instances, the primary operation may be to check an item into or out of a storage area, or to convert an item to an RFID-tagged item, but inventory (the secondary operation) can also be conducted in the background, perhaps to notify a user if the items presented for conversion are not presented in the expected order according to an order list of items.

Although inventory has been described above as the second operation, the same principles apply to other combinations of first and second operations. For example, when determining whether items are in the proper order (the first operation), an RFID reader may also search for items on a predetermined list of items (the second operation), such as items that are thought to be missing, damaged, on hold for a patron, or the like. Alternatively, when an RFID reader is used to interrogate RFID tags associated with items and assist a user in determining where the item belongs in a storage location (the first operation), the RFID reader may also search for items on a predetermined list of items, as described above. The various functions described as being a first operation or a second operation could be exchanged or coupled in any desired and appropriate manner, so that information gathered for one purpose is used for another purpose without the need for re-interrogating the RFID tags. Additional operations of the type described elsewhere herein could also be performed at the same time as the first and second operations, as desired.

Figure 4:
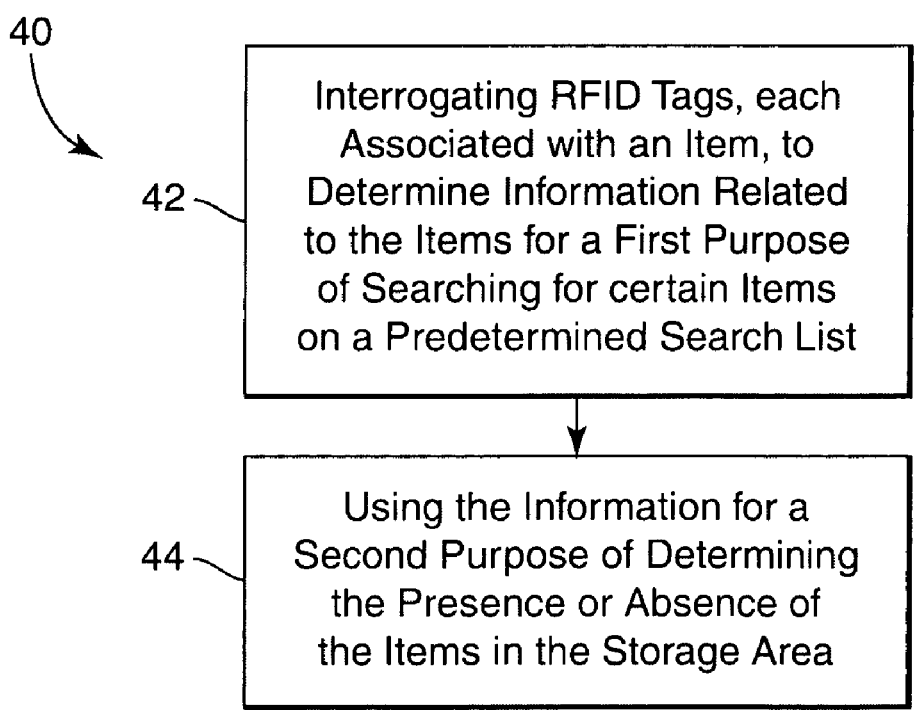
FIG. 4 illustrates one example of a method of obtaining information related to items of interest associated with RFID tags.

One example of a method 40 of obtaining information related to items of interest associated with RFID tags s is illustrated in FIG. 4 in a flow chart diagram. Method 40 includes step 42 of interrogating RFID tags, each associated with an item, to determine information related to the items for a first purpose of searching for certain items on a predetermined search list. Method 40 also includes step 44 of using the information for a second purpose of determining the presence or absence of the items in the storage area.

6. Real Time Inventory Reconciliation

In a related embodiment of the invention, a portable RFID reader performs real-time inventory reconciliation. That is, the portable RFID reader reads the RFID tags of items located in a storage area, such as on a shelf, and then compares the list of items detected with the expected contents of the storage area based on data stored in an inventory database. An inventory database may be stored on a removable data storage device, such as a flash memory card, or may be stored in memory that is part of the portable RFID reader, or in a database that is accessible by a wireless connection or otherwise in real time. These inventory databases may be separate from a master inventory database that is stored on a central computer, network, or the like, which can be updated by the real-time database continuously or intermittently. Real time inventory information can be provided to a user regarding items that should have been found but were not, items that should not have been found but were, or other discrepancies between the actual inventory and the inventory reflected on the database. The status of an item could be updated based on the information obtained from the interrogation, and the new status could be stored in the inventory database. A particularly useful feature of real-time inventory is for the RFID reader to enable the user to confirm, during interrogation, that a particular item that was not found (but was expected to have been found) is missing from the storage area. If the user confirms that the item is missing, then the RFID reader can correct the inventory database to indicate that the item is missing (that is, not present). The reverse may also be useful—enabling the user to confirm that a particular item that was found but was thought to be missing is actually present, and thus to correct the inventory database. The corrected inventory database may be stored wherever the original inventory database was stored. This real-time reconciliation of inventory saves time, and thus is a useful feature in inventory work. A user interface, such as one associated with a display, may enable the user to create or edit database records for any items that were interrogated but not found on the database, by prompting the user to input data associated with any required or optional fields in the database. This feature may enable a user to correct incomplete records in the database in real time as well.

Figure 5:
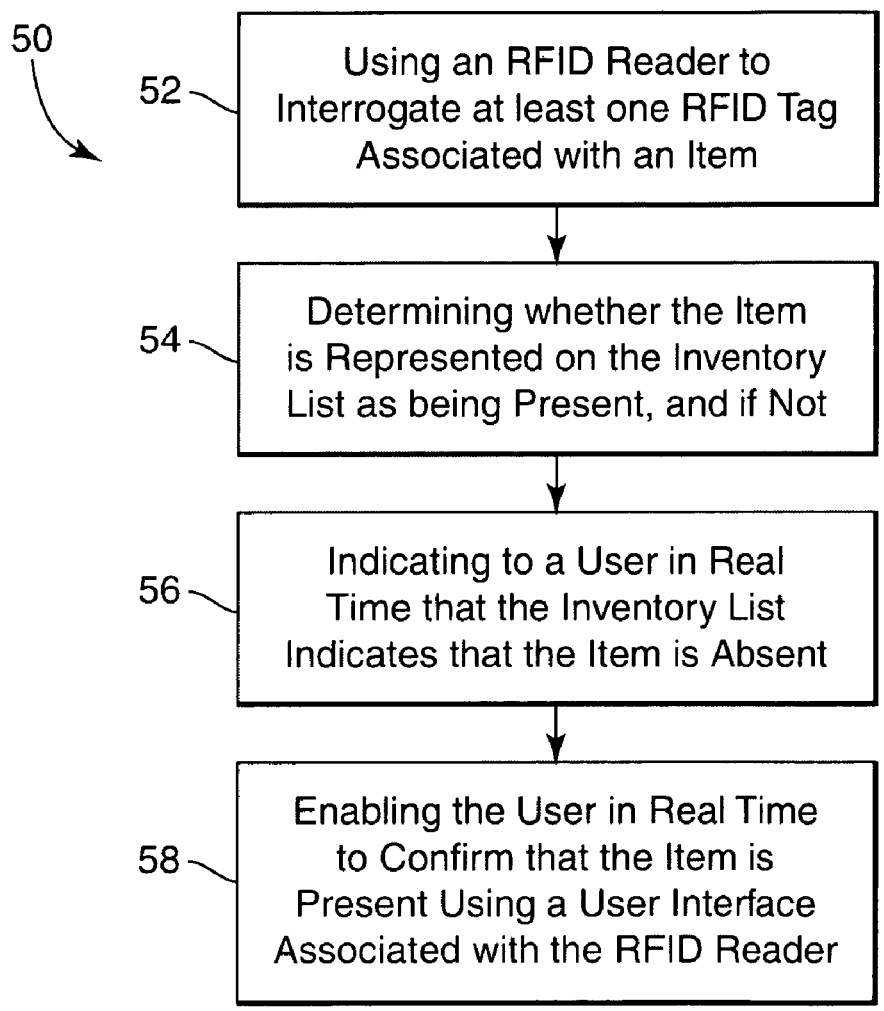
FIG. 5 illustrates one example of a method of reconciling an inventory list of items associated with RFID tags.

One example of a method 50 of reconciling an inventory list of items associated with RFID tags is illustrated in FIG. 5 in a flow chart diagram. Method 50 includes step 52 of using an RFID reader to interrogate at least one RFID tag associated with an item. Method 50 also includes step 54 of determining whether the item is represented on the inventory list as being present, and if not then proceeding to step 56. Step 56 includes indicating to a user in real time that the inventory list indicates that the item is absent. Method 50 also includes step 58 of enabling the user in real time to confirm that the item is present using a user interface associated with the RFID reader.

7. Sorting a Random Set

In libraries and other storage areas, considerable effort can be expended returning items to a storage area after use. These items generally must be put back into the proper location. Often this is done by manually sorting the items onto a cart, then traversing the storage area, taking the ordered items from the cart and replacing them on, for example, the shelves of the storage area. Automated assistance for this task is the purpose of the following embodiment of the present invention. In this embodiment, a portable RFID reader can be used to read the RFID tags associated with each of a set of randomly placed items and display a list of those items according to a predetermined order. The order may be a standard order for organizing items of that type (such as the Dewey Decimal system or the Library of Congress system for organizing materials in a library), or a customized order. When the RFID reader interrogates the random set of RFID-tagged items, the reader can organize information about those items in order, and then display either a part of or all of the list of ordered items. The information displayed in the list could be information obtained from the interrogated RFID tags, information obtained from a database, or a combination thereof. The list could be used to place the items in a storage area in the proper order, as with reshelving a group of library materials in their appropriate locations, or for placing the items on a cart for transportation to a storage area. The invention facilitates the placement of the items on the cart in the desired order, to make replacement of the items on the storage area shelves more efficient.

Figure 6:
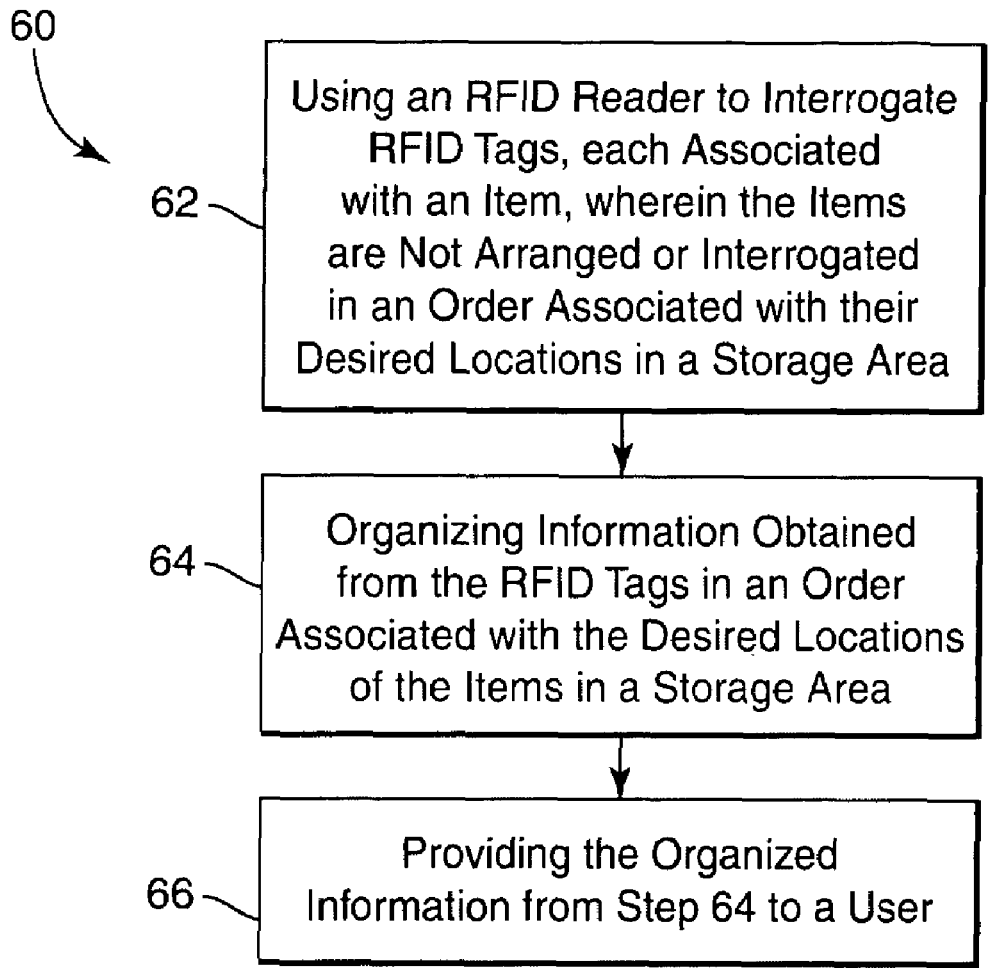
FIG. 6 illustrates one example of a method of collecting data related to items associated with RFID tags.

One example of a method 60 of collecting data related to items associated with RFID tags is illustrated in FIG. 6 in a flow chart diagram. Method 60 includes step 62 of using an RFID reader to interrogate RFID tags, each associated with an item, wherein the items are not arranged or interrogated in an order associated with their desired locations in a storage area. Method 60 also includes step 64 of organizing information obtained from the RFID tags in an order associated with the desired locations of the items in a storage area. Method 60 also includes step 66 of providing the organized information from step 64 to a user.

Since all the amendments are inserting new paragraphs or sections, a version marked up to show changes made to the specification relative to the previous version of the specification is not attached.

8. Altering the Permissible Error Tolerance

Some RFID readers are capable of simultaneously interrogating several RFID tags that are within the "read range" of the reader. It can be difficult to determine or resolve the exact relative positions of multiple RFID tags when those tags respond to the RFID reader substantially simultaneously, particularly when the RFID reader bypasses the items rapidly. However, a portable RFID reader can determine an approximate order of the items whose RFID tags are interrogated. When such an RFID reader is used to report storage area location order errors ("shelf order" errors) to a user, this approximate order is compared to an expected order. Because of the errors involved in approximating the shelf order of the items, false shelf order errors may be detected, which may provide an error report that is annoying, rather than useful, to the user. If the permissible error tolerance is increased to minimize the errors reported, then some detectable and significant errors may go unreported. The allowed error size could be described as order tolerance, or shelf order tolerance. This aspect of the present invention relates specifically to this potential problem.

The RFID reader and method of the present invention may be adapted to alter the error reporting algorithm, and specifically to alter the permissible error tolerance. The permissible error tolerance is the range of locations apart from an expected location for an item that the item is permitted by the algorithm to be, while still being considered to have been at the correct location. That is, the permissible error tolerance may be 1 location, so that an item that is 1 location removed from its expected location will be considered by the error reporting algorithm (and thus the RFID reader) to have been in the proper location. Any item that is more than 1 location removed from its expected location will be considered by the algorithm to have been out of position or mislocated. Altering the permissible error tolerance thus enables a user to increase or decrease the range of "acceptable" locations for an item. This alteration may be based on whether the items being interrogated are thin, medium, or thick. That is, the resolution of the RFID reader is normally sufficiently accurate to enable the reader to reliably detect the relative locations of thick items, such as encyclopedias, reference texts, and the like. In those cases, the user specifies that thick items are being interrogated, and the error detection algorithm is modified to classify as errors even small discrepancies between the detected position and the expected position. For thin items such as children's books or magazines, the RFID reader resolution may not be sufficient to accurately detect the relative positions of closely-spaced items. In those cases, the user specifies that thin items are being interrogated, and the error detection algorithm is modified to classify as errors only those errors that are sufficiently significant to be reliably attributable to misplacement rather than poor resolution. Although the designations "thin," "medium," and "thick" may be used, and may be useful because users understand those terms easily, it is of course possible to use numerical designations (for example, from 1 to 30) or other designations. If a numeric tolerance is used, the number could approximate the number of items per unit measure, such as the number of items per inch, centimeter, or foot. Thus the algorithm may be modified based on a characteristic of the items that is correlated to the proximity of RFID tags in adjacent items; typically the width of the items. The alteration of the permissible error tolerance may be made through a user interface, including a display (such as a touch panel display), buttons, or the like.

The variable resolution feature described above may also be done automatically, rather than by a user. That is, the RFID reader is normally moved past items at a certain "normal" rate during interrogation, which in the context of library materials may be approximately 2 items per second. The RFID reader may be programmed to infer that when items are being interrogated at more than the normal rate, the reader is moving past a greater number of thinner items (that is, the user is moving the reader past the items at approximately the same rate, but there are more items per unit length of the storage area). The reader may then dynamically adjust the error tolerance for misplaced items. For example, if the normal rate at which the RFID reader interrogates items is 2 items per second, and the RFID reader begins interrogating 5 items per second, then the RFID reader may change the error tolerance so that items that are within 2 positions on either side of the expected location (+/−2 positions) to +/−5positions. The reverse may also be true, so that if the interrogation rate is 1 item per second, then the error tolerance may be automatically changed from +/−2 positions to +/−1 position. The change in the error tolerance may be proportional to the change in interrogation rate, or directly proportional, or geometrically proportional, or otherwise variable based on the interrogation rate.

The foregoing embodiment of the invention may be difficult to implement if the RFID reader cannot reliably interrogate RFID tags at the faster interrogation rate, as suggested in the example. That is, some RFID readers may not be able to interrogate 5 items per second, and instead may continue to read 2 items per second and simply fail to interrogate the other 3 items successfully. In that and other instances, the resolution may still be varied by a user or automatically. This can be done by measuring the number of RFID tags simultaneously located within the "read range" of the RFID reader. For example, if the read range of the RFID reader were sufficient to detect tags within, say, a six-inch zone of a shelf, centered about the reader, then in a section of "normal" books, the RFID reader might simultaneously detect six RFID tags. In an area of "thin" items, the RFID reader might simultaneously detect 24 tags, or in an area of "thick" items, the RFID reader might simultaneously detect only 3 tags. Based on this measure, the RFID reader can automatically, through an algorithm, adjust its shelf order tolerance separately for each shelf. As with the previous embodiment, the adjustment can even be made dynamically as the shelf is scanned, so that a shelf that contains thin items on one end and thick items on the other end might be processed with different tolerances for different portions of the shelf In either case, the change in the error tolerance may be proportional to the number of tags simultaneously detected, or directly proportional, or geometrically proportional, or otherwise variable based on the measured number of tags.

9. Conversion of Non-RFID-Tagged Items to RFID-Tagged Items

An additional aspect of the present invention may be referred to for convenience as exception finding during conversion. Conversion, as that term has been used herein, refers generally to the process of converting non-RFID tagged items to RFID-tagged items. In one useful embodiment of a conversion station, the bar-code or other item identifier used on an item may be scanned or input into a processor, and the processor may use that information to create an RFID tag that will be associated with that item in a database. Other information, such as information in an existing database that is related to that item, may also be used in the RFID tag created for that item. That information may include, for example, the type of item, whether or not that item may be circulated, the archive or destruction date for the item, or other such information. The RFID tag may then be placed in or on the item, and the item processed as desired. Depending on how many items must be converted, the conversion process can be expensive, though generally well worth the attendant benefits.

One method of minimizing unnecessary expense in converting a collection of items to RFID-tagged items is the subject of this aspect of the invention. In this embodiment, the conversion station implements the additional step of determining whether the non-RFID-tagged item is on a list of items, or in a category of items, that should not be converted (or alternatively whether the item that may be converted is on a list of items, or in a category of items, that should be converted). That is, the person or entity that controls the collection of non-RFID tagged items may decide that certain items need not be converted, perhaps because the benefits of conversion do not justify the expense. This may be the case for older items, items that are infrequently or never used, items that are damaged, multiple copies of the same item, items with a short shelf life (such as periodicals) or the like. These types of items may either be listed individually based on information in an existing database, or may be listed by class ("items older than 5 years," or "damaged items," for example). When the conversion station receives data (by scanning a bar-code, optically reading characters, receiving data entered by an operator, or otherwise obtaining the data) identifying an item that has been presented to the conversion station for conversion, it determines whether the item has been identified as one not suitable for conversion (or alternatively, whether the item has not been identified as one that is suitable for conversion). If so, then the conversion station sends a signal indicative of that status. If not, then conversion can proceed. In this manner, only the minimum number of items need to be converted to RFID-tagged items, which results in a savings of both time and money, particularly for items that would otherwise be RFID-tagged and then discarded from the collection shortly thereafter.

In a specific embodiment of the invention described above, a database may be created of items (either specific items or characteristics of items that can be determined from the information known about those items) that the user does not wish to convert to RFID-tagged items. Alternatively, the database may be created exclusively of items (either specific items or characteristics of items that can be determined from the information known about those items) that the user does wish to convert to RFID-tagged items. In either case, this database may be transferred to (by download, or by upload from a removable data storage device) or otherwise made accessible to the conversion station, and then the information obtained from the non-RFID identification system associated with each item can be compared to the database to determine whether that item should be converted to an RFID-tagged item or not.

Other operations may also be performed in the course of converting non-RFID-tagged items to RFID-tagged items. For example, an inventory of items may be taken while those items are being converted, by comparing a list of items that were presented for conversion to a list of items that are indicated in a database as present. From that information, a list of presumptively missing items may be generated for a user. Another operation that can be performed during conversion is that of determining whether the items presented for conversion are in the proper, expected, or algorithm order. This is possible because during conversion, a user typically selects a first item from a storage area, such as a library shelf, presents that item to the conversion station, and then receives and applies an RFID tag that is associated with the item to the item. The user then replaces that item in the appropriate location in the storage area, and selects the next item. If the user converts items in order, then the order of the items presented may be compared either exactly (each item in its exact location) or approximately (each item within a specified number of locations relative to its expected location) to a list of items in an expected, proper, or algorithm order. The conversion station may then notify the user when items presented for conversion are not in the exact or approximate order.

10. List Matching and Storage

The '870 patent discloses an RFID reader which can be used to search for RFID-tagged items within a storage area, if information about the items of interest is provided to the RFID reader. If information about a grouping of such items of interest is initially provided to the RFID reader, such as a group or list name or other identifier, then the RFID reader can interrogate RFID-tagged items, determine whether the interrogated items match any item on the list, and if so, store information related to the matching item. For example, a list of items of interest can be provided to the RFID reader and given an identifier such as "missing items" to identify items that should be present in the storage area but which cannot currently be found. In this instance, if the RFID reader encounters and interrogates an RFID tag associated with an item in the storage area, and that tag contains information which matches an entry in the "missing items" list, the RFID reader could store information retrieved from or related to the interrogated RFID tag to a data collection category called "missing items" in a database. This data storage operation could be performed automatically, or after prompting the user of the RFID reader, and an inventory database may be updated either continuously or periodically with the information obtained. Lists of items, which may be referred to as "search lists," may be for items that a user or customer wishes to locate and check out, or use, or destroy, or archive, or transfer, for example. Since finding such items of interest in the storage area is useful to users of this type of system, if such an automatic data collection capability were unavailable the user might need to retain the item for later processing, or might need to make special efforts to "manually" store information about this item using some type of data collection capability, as described earlier. Thus embodiment of the invention saves time and effort by the user of the RFID reader.

We claim:

1. A method of interrogating radio frequency identification (RFID) tags associated with items of interest, comprising the steps of:
    (a) selecting at least two categories of items using a user interface associated with an RFID reader;
    (b) after selecting at least two categories, using the RFID reader to interrogate at least one RFID tag associated with an item of interest to obtain information associated with the item of interest, wherein the item of interest is not currently associated with the categories selected in step (a);
    (c) accessing a database stored in memory of a removable flash memory card of the RFID reader to retrieve information necessary to categorize each RFID-tagged item based on the information obtained from the RFID tag;
    (d) thereafter using the RFID reader to automatically categorize the information obtained in step (b) with at least one of the categories selected in step (a), and wherein information necessary to categorize each RFID-tagged item may be obtained from the RFID tag itself; and
    (e) saving the categorized information obtained in step (d) in the database.

2. The method of claim 1, wherein the categories are mutually exclusive.

3. The method of claim 1, wherein the categories are not mutually exclusive.

4. The method of claim 1, wherein one category describes whether an item is present in a storage area.

5. The method of claim 1, wherein the categories describe different types of items.

6. A method of interrogating radio frequency identification (RFID) tags associated with items of interest, comprising the steps of:
    (a) selecting at least one category of items and specifying one or more attributes associated with the selected category using a user interface associated with an RFID reader;
    (b) after selecting the category, interrogating RFID tags associated with items using the RFID reader, at least one of which is within the category of items;
    (c) using the RFID reader, categorizing information related to at least one item associated with the interrogated RFID tag in at least one of the categories for those items having the attributes specified for the selected category; and
    (d) ignoring any RFID-tagged-item that may not be categorized in any of the categories without listing or categorizing those items that do not have the attributes specified for the selected category,
    wherein in steps (c) and (d) the RFID reader determines which of the RFID-tagged-items may be categorized and which of the RFID-tagged-items may not be categorized in any of the categories.

7. The method of claim 6, wherein the method further includes the step of:
    (e) saving the categorized information in a database.

8. The method of claim 7, wherein at least one category describes items of a certain type.

9. The method of claim 7, wherein the RFID reader determines whether to categorize or ignore each RFID-tagged item based on information obtained from the RFID tag itself.

10. The method of claim 7, wherein the RFID reader determines whether to categorize or ignore each RFID-tagged item based on information obtained from a database stored in memory of the RFID reader.

11. The method of claim 10, wherein the database is stored on a removable data storage device.

12. The method of claim 11, wherein the removable data storage device is a flash memory card.

* * * * *